United States Patent [19]
Hirokane et al.

[11] Patent Number: 6,042,954
[45] Date of Patent: Mar. 28, 2000

[54] MAGNETO-OPTICAL RECORDING MEDIUM

[75] Inventors: Junji Hirokane, Nara; Junichiro Nakayama, Shiki-gun; Junsaku Nakajima, Kashihara; Akira Takahashi, Nara, all of Japan

[73] Assignee: Sharp Kabushiki Kaisha, Osaka, Japan

[21] Appl. No.: 08/844,270

[22] Filed: Apr. 18, 1997

[30] Foreign Application Priority Data

Apr. 22, 1996 [JP] Japan ..................................... 8-100053

[51] Int. Cl.$^7$ ....................................................... G11B 5/66
[52] U.S. Cl. ........................... 428/694 ML; 428/694 SC; 428/694 RE; 428/694 MM; 428/694 EC; 428/900; 369/13; 369/283
[58] Field of Search ...................... 428/694 ML, 694 SC, 428/694 RE, 694 MM, 694 EC, 900; 369/13, 283

[56] References Cited

U.S. PATENT DOCUMENTS

| | | | |
|---|---|---|---|
| 4,710,434 | 12/1987 | Sato | 428/678 |
| 4,838,962 | 6/1989 | Takayama | 148/304 |
| 4,880,694 | 11/1989 | Takayama | 428/336 |
| 5,691,072 | 11/1997 | Izumi et al. | 428/694 ML |

FOREIGN PATENT DOCUMENTS

| | | |
|---|---|---|
| 0509836 | 10/1992 | European Pat. Off. . |
| 0 596 716 A2 | 5/1994 | European Pat. Off. . |
| 0 821 354 A2 | 1/1998 | European Pat. Off. . |
| 0 822 547 A2 | 2/1998 | European Pat. Off. . |
| 195 16 983 A1 | 11/1995 | Germany . |
| 59-84358 | 5/1984 | Japan . |
| 7-307040 | 11/1995 | Japan . |
| 2071696 | 9/1981 | United Kingdom . |

OTHER PUBLICATIONS

K. Tamanoi et al., "Magnetically–Induced Super Resolution Unisng Magneto–Static Coupling," in Magneto–Optical Recording Symposium 1994, Digests of paper presented at MORIS '94, Sep. 27–29, 1994, Tokyo, Japan, 29–K–05, p. 126.

*Primary Examiner*—Leszek Kiliman
*Attorney, Agent, or Firm*—David G. Conlin; Peter J. Manus

[57] ABSTRACT

An magneto-optical recording medium includes: a transparent dielectric layer; a reproduction layer that is in an in-plane magnetization state at room temperature and changes into a perpendicular magnetization state with a rise in temperature; a non-magnetic intermediate layer; a recording layer made of a perpendicularly magnetized film; and a protection layer, the layers being formed one after another in this order. The recording layer is made of a rare-earth and transition metal alloy, and the rare earth metal is composed of more than two kinds of rare-earth-metal elements containing Gd. The information stored in a magnetic recording domain is masked with respect to a part that is in an in-plane magnetization state. Consequently, recording can be performed with a less powerful laser beam, and each recording bit can be reproduced independently to produce high quality signals even if the converged light beam covers a neighboring recording bit within its radius.

8 Claims, 2 Drawing Sheets

MAGNETO-OPTICAL RECORDING MEDIUM

FIELD OF THE INVENTION

The present invention relates to magneto-optical recording media, such as a magneto-optical disk, a magneto-optical tape and a magneto-optical card, for use with a magneto-optical recording and reproducing apparatus.

BACKGROUND OF THE INVENTION

Magneto-optical recording media has been in practical use as rewritable magneto-optical recording media. A problem with such conventional magneto-optical recording media is that their reproduction characteristics deteriorate as recording bits serving as magnetic recording domains have too small radii and intervals, in comparison with the radius of a light beam radiating from a semiconductor laser to be converged on the magneto-optical recording media.

The cause of such a defect is that the light beam converged on a targeted recording bit covers within its radius not only the targeted recording bit, but a neighboring recording bit as well, and that each recording bit therefore cannot be reproduced independently.

Japanese Laid-Open Patent Application No. 6-150418/1994 (Tokukaihei 6-150418) discloses a magneto-optical recording medium capable of solving the defect. The structure of the magneto-optical recording medium includes a non-magnetic intermediate layer provided between a recording layer and a reproduction layer that is in an in-plane magnetization state at room temperature and changes into a perpendicular magnetization state with a rise in temperature, wherein the recording layer and the reproduction layer are magnetostatically coupled.

The magneto-optical recording medium allows no information stored in a magnetic recording domain to be transferred to a part of the reproduction layer that is in an in-plane magnetization state as a result of low temperature, but allows the information stored in a magnetic recording domain to be transferred to a part of the reproduction layer that is in a perpendicular magnetization state as a result of a rise in temperature, thus inducing the polar Kerr effect. Therefore, the information stored in a magnetic recording domain is masked with respect to a part that is in an in-plane magnetization state, and each recording bit can be reproduced independently even if the converged light beam covers a neighboring recording bit within its radius.

Nevertheless, it has been confirmed that in order to stably performing reproduction on the magneto-optical recording medium disclosed in Japanese Laid-Open Patent Application No. 6-150418/1994 with recording bits having even smaller radii and intervals, it is necessary to generate a stronger leaking magnetic field from the recording layer and, thereby, stronger magnetostatic coupling between the recording layer and the reproduction layer. A stronger leaking magnetic field can be generated by a recording layer having a higher Curie temperature. Nevertheless, such a rise in the Curie temperature creates new problems: a resultant higher operation temperature during recording and a need for a more powerful laser beam to perform recording.

SUMMARY OF THE INVENTION

An object of the present invention is to offer a magneto-optical recording medium that enables recording with a less powerful laser beam and stable reproduction with recording bits having smaller radii and intervals by generating an enough strong leaking magnetic field from a recording layer.

In order to accomplish the object, a magneto-optical recording medium in accordance with the present invention has:

a reproduction layer that is in an in-plane magnetization state at room temperature and changes into a perpendicular magnetization state with a rise in temperature; and a recording layer that is made of a perpendicularly magnetized film and magnetostatically coupled with the reproduction layer, and is characterized in that
the recording layer is made of a rare-earth and transition metal alloy,
the rare earth metal is composed of more than two kinds of rare-earth-metal elements containing Gd, and
the recording layer has composition of
$(Gd_{X1}Dy_{1-X1})_{Y1}(Fe_{Z1}Co_{1-Z1})_{1-Y1}$ with
$0.10 \leq X1 \leq 0.75$,
$0.20 \leq Y1 \leq 0.28$, and
$0.60 \leq Z1 \leq 0.90$.

Another magneto-optical recording medium in accordance with the present invention has:

a reproduction layer that is in an in-plane magnetization state at room temperature and changes into a perpendicular magnetization state with a rise in temperature; and a recording layer that is made of a perpendicularly magnetized film and magnetostatically coupled with the reproduction layer, and is characterized in that
the recording layer is made of a rare-earth and transition metal alloy,
the rare earth metal is composed of more than two kinds of rare-earth-metal elements containing Gd, and
the recording layer has composition of
$(Gd_{X2}Tb_{1-X2})_{Y2}(Fe_{Z2}Co_{1-Z2})_{1-Y2}$ with
$0.10 \leq X2 \leq 0.85$,
$0.20 \leq Y2 \leq 0.28$, and
$0.70 \leq Z2 \leq 1.00$.

Still another magneto-optical recording medium in accordance with the present invention has:

a reproduction layer that is in an in-plane magnetization state at room temperature and changes into a perpendicular magnetization state with a rise in temperature; and a recording layer that is made of a perpendicularly magnetized film and magnetostatically coupled with the reproduction layer, and is characterized in that
the recording layer is made of a rare-earth and transition metal alloy,
the rare earth metal is composed of more than two kinds of rare-earth-metal elements containing Gd, and
the recording layer has composition of
$\{Gd_{X3}(Dy_{W3}Tb_{1-W3})_{1-X3}\}_{Y3}(Fe_{Z3}Co_{1-Z3})_{1-Y3}$ with
$0.10 \leq X3 \leq 0.85$,
$0.20 \leq Y3 \leq 0.28$,
$0.60 \leq Z3 \leq 1.00$, and
$0.00 < W3 < 1.00$.

The magneto-optical recording media, accordingly, enable recording with a less powerful laser beam. Also, since the magneto-optical recording media generate a stronger leaking magnetic field from the recording layer and a stronger magnetostatic coupling force between the recording layer and the reproduction layer, the magneto-optical recording media enable stable reproduction with recording bits having smaller radii and intervals.

DESCRIPTION OF THE EMBODIMENTS

Figure 1:
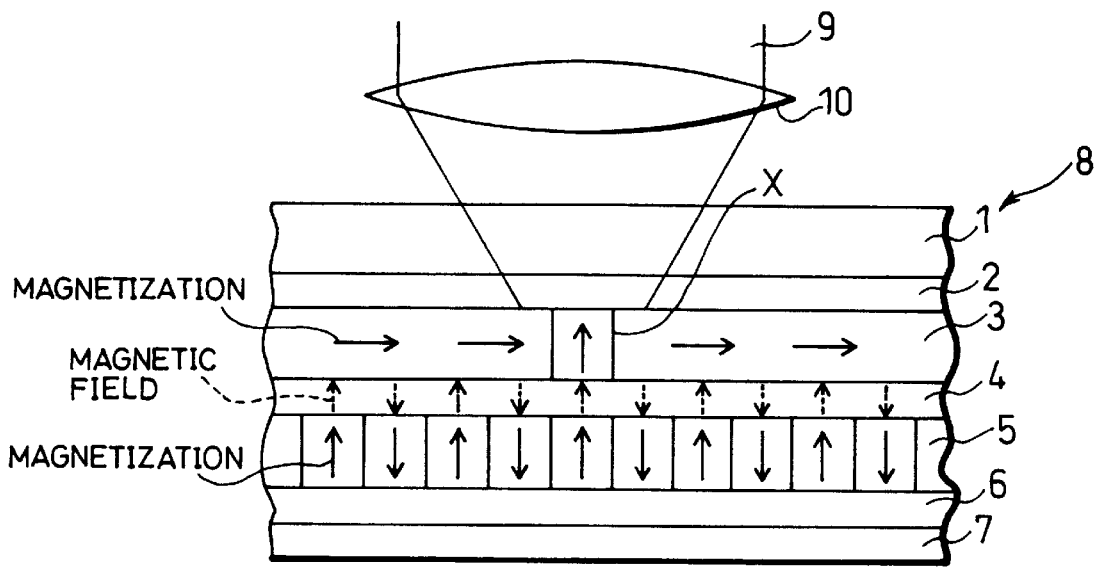
FIG. 1 is an explanatory view schematically showing a configuration of a magneto-optical disk of an embodiment in accordance with the present invention.

Referring to FIG. 1, the following description will explain an embodiment, in accordance with the present invention, adopting a magneto-optical disk as a magneto-optical recording medium.

As shown in FIG. 1, the magneto-optical disk includes a disk main body 8 formed by stacking a substrate 1, a transparent dielectric layer 2, a reproduction layer 3, a non-magnetic intermediate layer 4, a recording layer 5, a protection layer 6 and an overcoat layer 7 in this order.

A Curie temperature recording method is employed as a recording method for the magneto-optical recording medium: information is recorded and reproduced with a magneto-optical effect known as the polar Kerr effect by a light beam 9 radiating from a semiconductor laser and converged by an converging lens 10 on the reproduction layer 3. The polar Kerr effect is a phenomenon where the rotation of the plane of polarization of reflected light is reversed by the magnetization direction perpendicular to the incident surface.

The substrate 1 is made of, for example, a transparent material such as polycarbonate and formed in a disk shape.

The transparent dielectric layer 2, through which a semiconductor laser beam needs to pass, is made of a dielectric material such as AlN, SiN, AlSiN, $TaO_2$ and ZnS. The thickness of the transparent dielectric layer 2 needs to be set so as to realize a good diffraction effect and increase the Kerr rotation angle of a medium for an incident laser beam. The thickness is therefore set to about $\lambda/4n$, where the wavelength of the laser beam is $\lambda$, and the refractive index of the transparent dielectric layer 2 is n. For example, when the wavelength of the laser beam is 680 nm, the thickness of the transparent dielectric layer 2 is set to about 40 nm to 100 nm.

The reproduction layer 3 is a magnetic film of a rare-earth and transition metal alloy, such as GdFe, GdFeCo and GdDyFeCo. The composition of the reproduction layer 3 is adjusted so that the reproduction layer 3 has magnetic characteristics of being in an in-plane magnetization state at room temperature and changing into a perpendicular magnetization state with a rise in temperature (hereinafter, the temperature at which the state change occurs will be referred to as a critical temperature). Also, the thickness of the reproduction layer 3 is set to 5 nm to 60 nm. No reproduction layer having a thickness out of this range is suitable. A reproduction layer having a thickness of less than 5 nm allows too much of the laser beam to pass therethrough, and makes it difficult to provide a good masking, while a reproduction layer having a thickness of more than 60 nm increases the total heat capacity and requires a more powerful laser beam to perform recording.

The non-magnetic intermediate layer 4 is made of either a non-magnetic metal, such as Al, Ti and Ta, or a dielectric material, such as AlN and SiN. The thickness of the non-magnetic intermediate layer 4 is set to 6 nm to 40 nm. The non-magnetic intermediate layer 4 may be made of an alloy containing a magnetic metal, such as AlFe, AlCo, AlNi, AlFeN and SiFeN, as long as it is capable of blocking the exchange-coupling generated between the reproduction layer 3 and the recording layer 5.

The recording layer 5 is a perpendicularly magnetized film of a rare-earth and transition metal alloy. The rare earth metal is composed of more than two kinds of rare-earth-metal elements containing Gd: namely, GdDyFeCo, GdTbFeCo and GdDyTbFeCo. Also, the thickness of the recording layer 5 is set to 20 nm to 80 nm. No recording layer having a thickness out of this range is suitable. A recording layer having a thickness of less than 20 nm only generates a weak leaking magnetic field, consequently generating a weak magnetostatic coupling force between the recording layer and the reproduction layer 3 and making it difficult to perform stable reproduction. On the other hand, a recording layer having a thickness of more than 80 nm increases the total heat capacity and requires a more powerful laser beam to perform recording.

The protection layer 6, since only having to protect the recording layer 5 from corrosion such as oxidation, may be any thin film through which oxygen is difficult to pass, such as AlN, SiN, AlSiN, Al, Si, Ti and Ta. However, to provide good protection, the thickness of the protection layer 6 is preferably more than 5 nm.

The overcoat layer 7 is formed either by heating a thermosetting resin applied on the protection layer 6 with a spin coat method, or by exposing to an ultraviolet ray an ultraviolet-ray-setting resin applied on the protection layer 6 with a spin coat method.

The following description will explain operations of the magneto-optical disk.

For reproduction of the magneto-optical disk, the reproduction layer 3 is irradiated on a side thereof closer to the substrate 1 with the light beam 9 converged by the converging lens 10. The region of the reproduction layer 3 irradiated with the light beam 9 is hotter at the central part X thereof than at the peripheral part thereof. As the central part X becomes hotter than the critical temperature, the magnetization of the recording layer 5 is transferred to the central part X, whereas the peripheral part with temperatures lower than the critical temperature maintains the in-plane magnetization thereof. As a result, only the central part X of the light beam 9 exhibits the polar Kerr effect, and information stored in the recording layer 5 is reproduced with a light reflected at the central part X. In this manner, the magneto-optical disk enables reproduction of a recording bit having a smaller radius than that of the light beam 9 by eliminating affection from neighboring recording bits.

For recording of the magneto-optical disk, for example, the recording layer 5 is irradiated on a side thereof closer to the substrate 1 with a converged light beam to raise the temperature thereof. The coercive force of the recording layer 5 is thus weakened almost to zero, and an upward or downward magnetic field is applied depending upon information to be recorded. In this manner, information is recorded on the recording layer 5.

FIRST EMBODIMENT

The following description, explaining in more detail the magneto-optical disk of the first embodiment, is divided into three Sections about (1) the manufacturing method, (2) the characteristics of the recording layer, which are the features of the invention, and (3) the recording and reproduction characteristics.

(1) Manufacturing Method

Section (1) explains an example of the manufacturing method of the magneto-optical disk of the present embodiment.

First, a polycarbonate substrate 1 formed in a disk shape with a pregroove and prepits was placed on a substrate holder in a sputtering machine provided with an Al target, a GdFeCo alloy target and a GdDyFeCo alloy target. The inside of the sputtering machine was evacuated to $1 \times 10^{-6}$ Torr to be filled with a mixed gas of argon and nitrogen. A power supply was provided to the Al target under a gas pressure of $4 \times 10^{-3}$ Torr so as to form an 80-nm-thick transparent dielectric layer 2 composed of AlN on the substrate 1.

Next, the inside of the sputtering machine was evacuated again to $1 \times 10^{-6}$ Torr to be filled with an argon gas. A power supply was provided to the GdFeCo alloy target under a gas pressure of $4 \times 10^{-3}$ Torr so as to form a 20-nm-thick reproduction layer 3 composed of $Gd_{0.31}(Fe_{0.78}Co_{0.22})_{0.69}$ on the transparent dielectric layer 2. The reproduction layer 3 exhibited a compensation temperature of 300° C., a Curie temperature of 360° C., and characteristics of being in an in-plane magnetization state at room temperature and changing into a perpendicular magnetization state at a temperature of 120° C.

Subsequently, the inside of the sputtering machine was filled with a mixed gas of argon and nitrogen. A power supply was provided to the Al target under a gas pressure of $4 \times 10^{-3}$ Torr so as to form a 20-nm-thick non-magnetic intermediate layer 4 composed of AlN on the reproduction layer 3.

Next, the inside of the sputtering machine was evacuated again to $1 \times 10^{-6}$ Torr to be filled with an argon gas. A power supply was provided to the GdDyFeCo alloy target under a gas pressure of $4 \times 10^{-3}$ Torr so as to form a 40-nm-thick recording layer 5 composed of $(Gd_{0.50}Dy_{0.50})_{0.24}(Fe_{0.80}Co_{0.20})_{0.76}$ on the non-magnetic intermediate layer 4. The recording layer 5 exhibited a compensation temperature of 50° C. and a Curie temperature of 275° C.

Next, the inside of the sputtering machine was filled with a mixed gas of argon and nitrogen. A power supply was provided to the Al target under a gas pressure of $4 \times 10^{-3}$ Torr so as to form a 20-nm-thick protection layer 6 of AlN on the recording layer 5.

Finally, an ultraviolet-ray-setting resin was applied on the protection layer 6 with a spin coat method, and exposed to an ultraviolet ray to form an overcoat layer 7.

(2) Characteristics of Recording Layer

Section (2) explains characteristics of the recording layer 5 manufactured as in Section (1), in comparison with a comparative example.

The comparative example used here was a comparative disk (a2) having, in lieu of the recording layer 5, a 40-nm-thick recording layer 5' (not shown) composed of $Dy_{0.24}(Fe_{0.75}Co_{0.25})_{0.76}$ with no Gd. The recording layer 5' exhibited a compensation temperature of 50° C. and a Curie temperature of 275° C.

Figure 2:
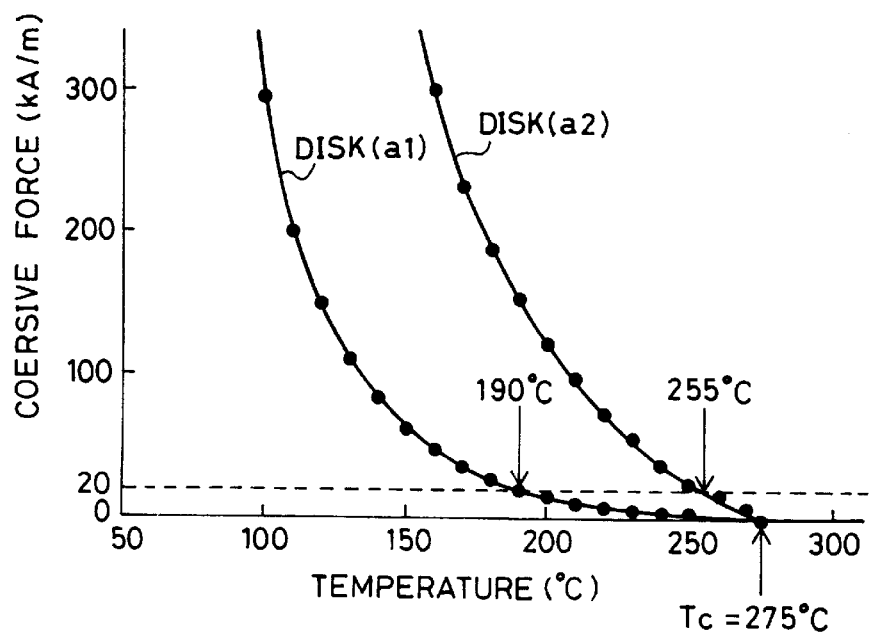
FIG. 2 is a graph showing a comparison of magnetic characteristics between a recording layer of the magneto-optical disk in accordance with the present invention and a recording layer of a conventional magneto-optical disk.

FIG. 2 shows the temperature dependency of the coercive force of the recording layer 5 of the magneto-optical disk (a1) of the present embodiment manufactured as in Section (1) and that of the recording layer 5' of the comparative disk (a2) As shown in FIG. 2, the recording layers 5 and 5', although both exhibiting a compensation temperature of 50° C. and a Curie temperature of 275° C., generate different coercive forces in terms of their dependency on temperature. The magneto-optical disk (a1) of the present embodiment loses much of its coercive force at temperatures slightly lower than the Curie temperature, while the comparative disk (a2) maintains its coercive force even near the Curie temperature.

To obtain good reproduction characteristics with the magneto-optical disk in accordance with the present invention, the magnetization of the recording layer 5 needs to be weak where the reproduction layer 3 is in the in-plane magnetization state, that is, where temperature has not risen yet, and strong enough to produce a necessary magnetostatic coupling force with the reproduction layer 3 where the reproduction layer 3 is in the perpendicular magnetization state, that is, where tempe rature has risen with laser radiation.

The weakening of the magnetization of the recording layer 5 where the temperature of the reproduction layer 3 has not risen yet can be realized by setting the compensation temperature of the recording layer 5 to near room temperature. In the embodiment, the compensation temperature of the recording layer 5 is set to 50° C. Next, as the temperature rises with laser radiation, the magnetization of the recording layer 5 is strengthened and, after reaching a local maximum value, is weakened to zero at the Curie temperature. Therefore, the Curie temperature of the recording layer 5 needs to be high in order to realize enough strong magnetization of the recording layer 5 to produce a necessary magnetostatic coupling force between the recording layer 5 and the reproduction layer 3 where the temperature has risen with laser radiation.

With a magneto-optical recording method, recording is performed by raising the temperature of a certain portion with radiation of a converged laser beam and then directing magnetization of that portion with an external magnetic field stronger than the coercive force of the portion that has been weakened due to the rise in temperature. The external magnetic field is generally set to about 20 kA/m. To perform recording with an external magnetic field of 20 kA/m, the recording layer 5' of the comparative disk (a2) needs to be heated to 250° C., while the recording layer 5 of the magneto-optical disk (a1) of the present embodiment needs to be heated to 190° C.

As described so far, the recording layers 5 and 5' exhibit the same compensation temperature and Curie temperature, that is, exhibit almost the same magnetization for reproduction. Nevertheless, the recording layer 5 of the present embodiment enables recording with a smaller rise in temperature than the recording layer 5', and as a result, with a less powerful laser beam than the recording layer 5'. Consequently, the recording layer 5 enables both recording with a less powerful laser beam and stable reproduction with recording bits having smaller radii and intervals by generating a stronger leaking magnetic field, that is, by raising the Curie temperature, and thereby generating a stronger magnetostatic coupling force between the reproduction layer 3 and the recording layer 5.

(3) Recording and Reproduction Characteristics

Recording and reproduction was performed on the magneto-optical disk (a1) and the comparative disk (a2) with a magnetic field modulation recording method using an optical pickup outputting a semiconductor laser having a wavelength of 680 nm. More specifically, recording was performed on the recording layer with bit pitches of 0.8 $\mu$m and reproduction was performed with a reproduction power of 2.2 mW, by rotating the magneto-optical recording media at a linear velocity of 3 m/s and continuously applying onto the rotating magneto-optical recording media a semiconductor laser beam and an a.c. magnetic field driven at a frequency of 3.75 MHz to have an amplitude of ±20 kA/m.

A laser power required for recording was checked. A signal-to-noise ratio (CNR) of 46 dB was obtained with both the disks, which is better than the signal quality generally regarded essential to an magneto-optical disk (45 dB). This is because the disks have the same Curie temperature and magnetostatic coupling force between the reproduction layer and the recording layer.

However, a check for a laser power necessary to obtain a reproduction signal of 46 dB during recording confirmed that recording should be performed with a laser power of 4.1 mW on the magneto-optical disk (a1) of the present embodiment, and with a laser power of 5.1 mW on the comparative disk (a2). This is because, as explained in connection with FIG. 2, the operation temperature during recording differs between the magneto-optical disk (a1) of the present embodiment and the comparative disk (a2): 190° C. for the magneto-optical disk (a1) of the present embodiment and 255° C. for the comparative disk (a2).

Table 1 shows results of measurement of CNRs and laser powers required for recording on the magneto-optical disk (a1), the comparative disk (a2) and disks having a recording layer made in the same process as the recording layer 5 of the present embodiment, however, wish different composition The variations in the composition of the recording layers are indicated in Table 1 by X1 which is Around in the composition formula of the recording layer: $(Gd_{X1}Dy_{1-X1})_{0.24}(Fe_{0.80}Co_{0.20})_{0.76}$.

TABLE 1

| X1 | CNR (dB) | Recording Laser Power (mW) |
|---|---|---|
| 0.05 | 46.0 | 5.1 |
| 0.10 | 46.1 | 4.8 |
| 0.25 | 45.9 | 4.5 |
| 0.50 | 46.0 | 4.1 |
| 0.70 | 45.9 | 4.1 |
| 0.75 | 45.0 | 4.0 |
| 0.80 | 42.5 | 4.1 |
| 0 | 46.0 | 5.1 |

Table 1 shows that the disks of $0.10 \leq X1 \leq 0.75$ requires a less laser power for recording than the comparative disk, and produce a better CNR than 45 dB which is generally regarded essential to an magneto-optical disk. The decrease of CNR for X1>0.75, which indicates that good recording cannot be performed any more, is possibly caused by the recording layer containing a large amount of Gd and having small perpendicular magnetism anisotropy.

In the description of the present embodiment so far, the recording layer 5 contains the rare metal (RE) and the transition metal (TM) in a composition ratio of RE:TM= 0.24:0.76. However, any RE-TM ratio enables good reproduction as long as that ratio can compose a recording layer 5 exhibiting a compensation temperature between −50° C. and 100° C. Specifically, $0.20 \leq Y1 \leq 0.28$ is preferable, wherein Y1 is found in the formula: RE:TM=Y1:1−Y1.

Also, in the description of the present embodiment so far, the recording layer 5 contains Fe and Co in a composition ratio of Fe:Co=0.80:0.20. A high content of CO raises the Curie temperature of the recording layer 5, enabling more stable reproduction. However, a higher Curie temperature means a higher operation temperature and requires a more powerful laser beam. Therefore, the content of Co is preferably decided so that the operation temperature does not exceed 240° C. Specifically, $0.60 \leq Z1 \leq 0.90$ is preferable, wherein Z1 is found in the formula: Fe:Co=Z1:1−Z1.

SECOND EMBODIMENT

The following description, explaining a magneto-optical disk of a second embodiment, is divided into three Sections about (1) the manufacturing method, (2) the characteristics of the recording layer, which are the features of the invention, and (3) the recording and reproduction characteristics.

(1) Manufacturing Method

A magneto-optical disk (b1) of the present embodiment was formed in the same process as the magneto-optical disk (a1) of the first embodiment, with an only change made in the composition of the recording layer 5. The recording layer 5 of the magneto-optical disk (b1), formed with a GdTb-FeCo alloy target, had a thickness of 40 nm and was composed of $(Gd_{0.50}Tb_{0.50})_{0.24}(Fe_{0.84}Co_{0.16})_{0.76}$. The recording layer 5 exhibited a compensation temperature of 50° C. and a Curie temperature of 275° C.

No other changes were made to the magneto-optical disk of the first embodiment.

(2) Characteristics of Recording Layer

Section (2) explains characteristics of the recording layer 5 of the present embodiment, in comparison with a comparative disk (b2) having, in lieu of the recording layer 5, a 40-nm-thick recording layer 5' (not shown) composed of $Tb_{0.24}(Fe_{0.83}Co_{0.17})_{0.76}$ with no Gd. The recording layer 5' of the comparative disk (b2) exhibited a compensation temperature of 50° C. and a Curie temperature of 275° C.

Figure 3:
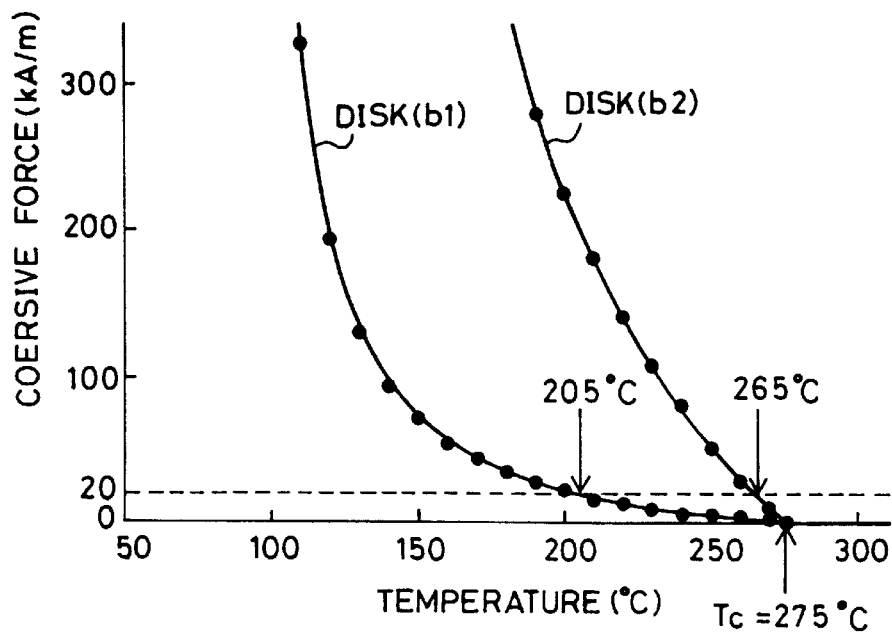
FIG. 3 is a graph showing a comparison of magnetic characteristics between a recording layer of the magneto-optical disk in accordance with the present invention and a recording layer of a conventional magneto-optical disk.

FIG. 3 shows the temperature dependency of the coercive force of the recording layer 5 of the magneto-optical disk (b1) of the present embodiment and that of the recording layer 5' of the comparative disk (b2). As shown in FIG. 3, the recording layers 5 and 5', although both exhibiting a compensation temperature of 50° C. and a Curie temperature of 275° C., generate different coercive forces in terms of their temperature dependency. The magneto-optical disk (b1) of the present embodiment loses much of its coercive force at temperatures slightly lower than the Curie temperature, while the comparative disk (b2) maintains its coercive force even near the Curie temperature.

To perform recording with an external magnetic field of 20 kA/m, the recording layer 5' of the comparative disk (b2) needs to be heated to 250° C., while the recording layer 5 of the magneto-optical disk (b1) of the present embodiment needs to be heated to 205° C.

As described so far, the recording layers 5 and 5' exhibit the same Curie temperature. Nevertheless, the recording layer 5 of the present embodiment enables recording with a smaller rise in temperature than the recording layer 5', and as a result, with a less powerful laser beam than the recording layer 5'. Consequently, the recording layer 5 enables both recording with a less powerful laser beam and stable reproduction with recording bits having smaller radii and intervals by generating a stronger leaking magnetic field, that is, by raising the Curie temperature, and thereby generating a stronger magnetostatic coupling force between the reproduction layer 3 and the recording layer 5.

(3) Recording and Reproduction Characteristics

Table 2, in the same manner as Table 1 of the first embodiment, shows results of measurement of CNRs and laser powers required for recording on the magneto-optical disk (b1), the comparative disk (b2) and disks having a recording layer made in the same process as the recording layer 5 of the present embodiment, however, with different composition. The variations in the composition of the recording layers are indicated in Table 2 by X2 which is found in the composition formula of the recording layer: $(Gd_{X2}Tb_{1-X2})_{0.24}(Fe_{0.84}Co_{0.16})_{0.76}$.

TABLE 2

| X2 | CNR (dB) | Recording Laser Power (mW) |
|---|---|---|
| 0.05 | 46.2 | 5.4 |
| 0.10 | 46.1 | 5.0 |
| 0.25 | 46.2 | 4.8 |
| 0.50 | 46.3 | 4.5 |
| 0.70 | 46.1 | 4.3 |
| 0.80 | 45.7 | 4.3 |
| 0.85 | 45.1 | 4.4 |
| 0.90 | 42.1 | 4.5 |
| 0 | 46.3 | 5.4 |

Table 2 shows that the disks of $0.10 \leq X2 \leq 0.85$ requires a less laser power for recording than the comparative disk, and produce a better CNR than 45 dB which is generally regarded essential to an magneto-optical disk. The decrease of CNR for X2>0.85, which indicates that good recording cannot be performed any more, is possibly caused by the recording layer containing a large amount of Gd and having small perpendicular magnetism anisotropy.

In the description of the present embodiment so far, the recording layer 5 contains the rare metal (RE) and the transition metal (TM) in a composition ratio of RE:TM= 0.24:0.76. However, in the same manner as in the first embodiment, any RE-TM ratio enables good reproduction as long as that ratio can compose a recording layer 5 exhibiting a compensation temperature between −50° C. and 100° C. Specifically, $0.20 \leq Y2 \leq 0.28$ is preferable, wherein Y2 is found in the formula: RE:TM=Y2:1−Y2.

Also, in the description of the present embodiment so far, the recording layer 5 contains Fe and Co in a composition ratio of Fe:Co=0.84:0.16. A high content of Co raises the Curie temperature of the recording layer 5, enabling more stable reproduction. However, a higher Curie temperature means a higher operation temperature and requires a more powerful laser beam. Therefore, the content of Co is preferably decided so that the operation temperature does not exceed 240° C. Specifically, $0.70 \leq Z2 \leq 1.00$ is preferable, wherein Z2 is found in the formula: Fe:Co=Z2:1−Z2.

THIRD EMBODIMENT

The following description, explaining in more detail the magneto-optical disk of the first embodiment, is divided into three Sections about (1) the manufacturing method, (2) the characteristics of the recording layer, which are the features of the invention, and (3) the recording and reproduction characteristics.

(1) Manufacturing Method

A magneto-optical disk (c1) of the present embodiment was formed in the same process as the magneto-optical disk of the first embodiment, with an only change made in the composition of the recording layer 5. The recording layer 5 of the magneto-optical disk (c1), formed with a GdDyTb-FeCo alloy target, had a thickness of 40 nm and was composed of $\{Gd_{0.50}(Dy_{0.50}Tb_{0.50})_{0.50}\}_{0.24}(Fe_{0.82}CO_{0.18})_{0.76}$. The recording layer 5 exhibited a compensation temperature of 50° C. and a Curie temperature of 275° C.

No other changes were made to the magneto-optical disk of the first embodiment.

(2) Characteristics of Recording Layer

Section (2) explains characteristics of the recording layer 5 of the present embodiment, in comparison with a comparative disk (c2) having, in lieu of the recording layer 5, a 40-nm-thick recording layer 5' (not shown) composed of $(Dy_{0.50}Tb_{0.50})_{0.24}(Fe_{0.79}Co_{0.21})_{0.76}$ with no Gd. The recording layer 5' of the comparative disk (c2) exhibited a compensation temperature of 50° C. and a Curie temperature of 275° C.

Figure 4:
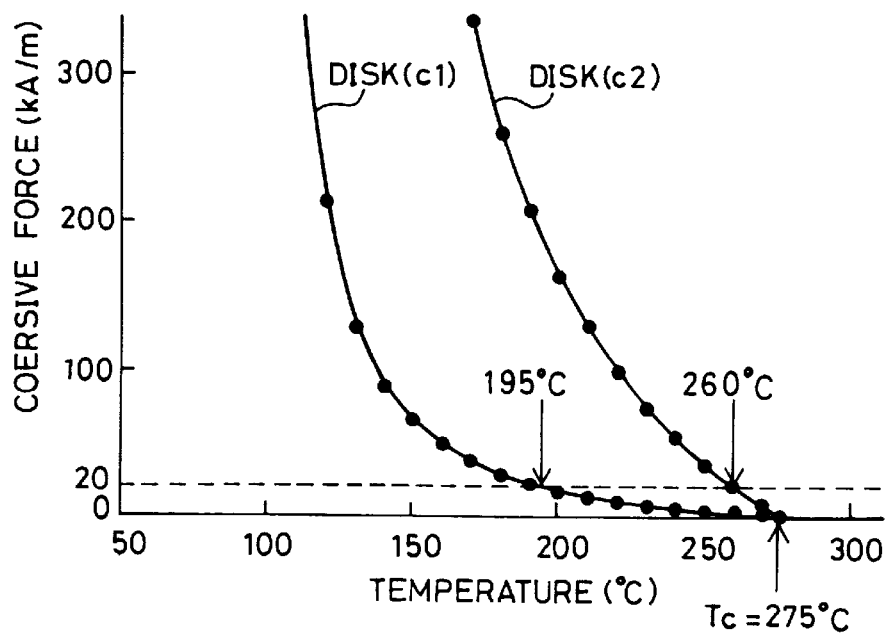
FIG. 4 is a graph showing a comparison of magnetic characteristics between a recording layer of the magneto-optical disk in accordance with the present invention and a recording layer of a conventional magneto-optical disk.

FIG. 4 shows the temperature dependency of the coercive force of the recording layer 5 of the magneto-optical disk (c1) of the present embodiment and that of the recording layer 5' of the comparative disk (c2). As shown in FIG. 4, the recording layers 5 and 5', although both exhibiting a compensation temperature of 50° C. and a Curie temperature of 275° C., generate different coercive forces in terms of their temperature dependency. The magneto-optical disk (c1) of the present embodiment loses much of its coercive force at temperatures slightly lower than the Curie temperature, while the comparative disk (c2) maintains its coercive force even near the Curie temperature.

To perform recording with an external magnetic field of 20 kA/m, the recording layer 5' of the comparative disk (c2) needs to be heated to 260° C., while the recording layer 5 of the magneto-optical disk (c1) of the present embodiment needs to be heated to 195° C.

As described so far, the recording layers 5 and 5' exhibit the same Curie temperature and therefore produce almost the same leaking magnetic field. Nevertheless, the recording layer 5 of the present embodiment enables recording with a smaller rise in temperature than the recording layer 5', that is, with a less powerful laser beam than the recording layer 5'.

Consequently, the magneto-optical disk (c1) with the recording layer 5 of the present embodiment enables: ① stable reproduction with recording bits having smaller radii and intervals by generating a stronger leaking magnetic field and a stronger magnetostatic coupling force between the reproduction layer and the recording layer, and ② recording with a less powerful laser beam.

(3) Recording and Reproduction Characteristics

Table 3, in the same manner as Table 1 of the first embodiment, shows results of measurement of CNRs and laser powers required for recording on the magneto-optical disk (c1), the comparative disk (c2) and disks having a recording layer made in the same process as the recording layer 5 of the present embodiment, however, with different composition. The variations in the composition of the recording layers are indicated in Table 3 by X3 which is found in the composition formula of the recording layer: $\{Gd_{X3}(Dy_{0.50}Tb_{0.50})_{1-X3}\}_{0.24}(Fe_{0.82}Co_{0.18})_{0.76}$.

TABLE 3

| X3 | CNR (dB) | Recording Laser Power (mW) |
|---|---|---|
| 0.05 | 46.1 | 5.3 |
| 0.10 | 46.1 | 5.1 |
| 0.25 | 46.2 | 4.7 |
| 0.50 | 46.2 | 4.2 |
| 0.70 | 45.9 | 4.1 |
| 0.80 | 45.2 | 4.2 |
| 0.85 | 43.2 | 4.2 |
| 0 | 46.2 | 5.3 |

Table 3 shows that the disks of $0.10 \leq X3 \leq 0.80$ requires a less laser power for recording than the comparative disk, and produce a better CNR than 45 dB which is generally regarded essential to an magneto-optical disk. The decrease of CNR for X3>0.85, which indicates that good recording cannot be performed any more, is possibly caused by the recording layer containing a large amount of Gd and having small perpendicular magnetism anisotropy.

In the description of the present embodiment so far, the recording layer 5 contains the rare metal (RE) and the transition metal (TM) in a composition ratio of RE:TM= 0.24:0.76. However, in the same manner as in the first embodiment, any RE-TM ratio enables good reproduction as long as that ratio can compose a recording layer 5 exhibiting a compensation temperature between −50° C. and 100° C. Specifically, $0.20 \leq Y3 \leq 0.28$ is preferable, wherein Y3 is found in the formula: RE:TM=Y3:1−Y3.

Also, in the description of the present embodiment so far, the recording layer 5 contains Fe and Co in a composition ratio of Fe:Co=0.82:0.18. A high content of Co raises the Curie temperature of the recording layer 5, enabling more stable reproduction. However, a higher Curie temperature means a higher operation temperature and requires a more powerful laser beam. Therefore, the content of Co is preferably decided so that the operation temperature does not exceed 240° C. Specifically, $0.65 \leq Z3 \leq 0.95$ is preferable, wherein Z3 is found in the formula: Fe:Co=Z3:1−Z3.

In the description of the present embodiment, the Dy-Tb ratio is 0.5:0.5. However, the recording layer used here has a Dy-Tb ratio between that of the first embodiment (Dy:Tb=1.0:0.0) and that of the second embodiment (Dy:Tb=0.0:1.0). Therefore, when the Dy-Tb ratio is changed, as is clear from the first and second embodiments, X3, Y3, Z3 and W3 are preferably in ranges of $0.10 \leq X3 \leq 0.85$, $0.20 \leq Y3 \leq 0.28$, $0.60 \leq Z3 \leq 1.00$, and $0.00 < W3 < 1.00$, wherein X3, Y3, Z3 and W3 are found in the formula: $\{Gd_{X3}(Dy_{W3}Tb_{1-W3})_{1-X3}\}_{Y3} (Fe_{Z3}Co_{1-Z3})_{1-Y3}$.

As described so far, a magneto-optical recording medium in accordance with the present invention has:

a reproduction layer that is in an in-plane magnetization state at room temperature and changes into a perpendicular magnetization state with a rise in temperature; and a recording layer that is made of a perpendicularly magnetized film and magnetostatically coupled with the reproduction layer, and is characterized in that the recording layer has composition of
$(Gd_{X1}Dy_{1-X1})_{Y1}(Fe_{Z1}Co_{1-Z1})_{1-Y1}$ with
$0.10 \leq X1 \leq 0.75$,
$0.20 \leq Y1 \leq 0.28$, and
$0.60 \leq Z1 \leq 0.90$.

Another magneto-optical recording medium in accordance with the present invention has:

a reproduction layer that is in an in-plane magnetization state at room temperature and changes into a perpendicular magnetization state with a rise in temperature; and a recording layer that is made of a perpendicularly magnetized film and magnetostatically coupled with the reproduction layer, and is characterized in that the recording layer has composition of
$(Gd_{X2}Tb_{1-X2})_{Y2}(Fe_{Z2}Co_{1-Z2})_{1-Y2}$ with
$0.10 \leq X2 \leq 0.85$,
$0.20 \leq Y2 \leq 0.28$, and
$0.70 \leq Z2 \leq 1.00$.

Still another magneto-optical recording medium in accordance with the present invention has:

a reproduction layer that is in an in-plane magnetization state at room temperature and changes into a perpendicular magnetization state with a rise in temperature; and a recording layer that is made of a perpendicularly magnetized film and magnetostatically coupled with the reproduction layer, and is characterized in that the recording layer has composition of
$\{Gd_{X3}(Dy_{W3}Tb_{1-W3})_{1-X3}\}_{Y3} (Fe_{Z3}Co_{1-Z3})_{1-Y3}$ with
$0.10 \leq X3 \leq 0.85$,
$0.20 \leq Y3 \leq 0.28$,
$0.60 \leq Z3 \leq 1.00$, and
$0.00 < W3 < 1.00$.

The magneto-optical recording media configured as above enable recording with a less powerful laser beam. Also, since the magneto-optical recording media generate a stronger leaking magnetic field from the recording layer and a stronger magnetostatic coupling force between the recording layer and the reproduction layer, the magneto-optical recording media enable stable reproduction with recording bits having smaller radii and intervals.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magneto-optical recording medium, comprising:

a reproduction layer that is in an in-plane magnetization state at room temperature and changes into a perpendicular magnetization state with a rise in temperature; and a recording layer that is made of a perpendicularly magnetized film and magnetostatically coupled with said reproduction layer, wherein said recording layer has composition of
$\{Gd_{X3}(Dy_{W3}Tb_{1-W3})_{1-X3}\}_{Y3} (Fe_{Z3}Co_{1-Z3})_{1-Y3}$ with
$0.10 \leq X3 \leq 0.85$,
$0.20 \leq Y3 \leq 0.28$,
$0.60 \leq Z3 \leq 1.00$, and
$0.00 < W3 < 1.00$.

2. A magneto-optical recording medium comprising:

a reproduction layer that is in an in-plane magnetization state at room temperature and changes into a perpendicular magnetization state with a rise in temperature; and a recording layer that is made of perpendicularly magnetized film and magnetostatically coupled with said reproduction layer, wherein said recording layer has composition of
$(Gd_{X1}Dy_{1-X1})_{Y1}(Fe_{Z1}Co_{1-Z1})_{1-Y1}$ with
$0.10 \leq X1 \leq 0.75$,
$0.20 \leq Y1 \leq 0.28$, and
$0.60 \leq Z1 \leq 0.90$.

3. A magneto-optical recording medium comprising:

a reproduction layer that is in an in-plane magnetization state at room temperature and changes into a perpendicular magnetization state with a rise in temperature; and a recording layer that is made of a perpendicularly magnetized film and magnetostatically coupled with said reproduction layer, wherein said recording layer has composition of
$(Gd_{X2}Tb_{1-X2})_{Y2}(Fe_{Z2}Co_{1-Z2})_{1-Y2}$ with
$0.10 \leq X2 \leq 0.85$,
$0.20 \leq Y2 \leq 0.28$, and
$0.70 \leq Z2 \leq 1.00$.

4. The magneto-optical recording medium as defined in any of claims 1 to 3, wherein said recording layer has a compensation temperature of not lower than −50° C. and not higher than 100° C.

5. The magneto-optical recording medium as defined in any of claims 1 to 3, wherein said recording layer has a Curie temperature that is lower than a Curie temperature of said reproduction layer and higher than a temperature at which said reproduction layer changes from the in-plane magnetization state to the perpendicular magnetization state.

6. The magneto-optical recording medium as defined in any of claims 1 to 3, wherein said recording layer has a coercive force of not less than 20 kA/m in a neighborhood of a temperature at which said reproduction layer changes from the in-plane magnetization state to the perpendicular magnetization state, and not more than 20 kA/m in a temperature range from a temperature more than 70° C. lower than the Curie temperature of said recording layer to the Curie temperature of said recording layer.

7. The magneto-optical recording medium as defined in any of claims 1 to 3, wherein an intermediate layer made of a non-magnetic film is provided between said recording layer and said reproduction layer.

8. The magneto-optical recording medium of any of claims 1–3 wherein the temperature at which the reproduction layer changes from an in-plane magnetization state to a perpendicular magnetization state is lower than the Curie temperature of the recording layer.

* * * * *